United States Patent
Noronha, Jr.

(10) Patent No.: US 7,899,089 B2
(45) Date of Patent: Mar. 1, 2011

(54) CONSTANT BIT RATE PADDING OF MPEG TRANSPORT STREAMS

(75) Inventor: Ciro A. Noronha, Jr., Palo Alto, CA (US)

(73) Assignee: Ericsson Television, Inc., Duluth, GA (US)

( * ) Notice: Subject to any disclaimer, the term of this patent is extended or adjusted under 35 U.S.C. 154(b) by 280 days.

(21) Appl. No.: 12/169,835

(22) Filed: Jul. 9, 2008

(65) Prior Publication Data
US 2010/0008385 A1    Jan. 14, 2010

(51) Int. Cl.
*H04J 3/00*    (2006.01)
(52) U.S. Cl. ........................... 370/545; 370/537
(58) Field of Classification Search ............... 370/545, 370/537
See application file for complete search history.

(56) References Cited

U.S. PATENT DOCUMENTS

| | | | |
|---|---|---|---|
| 5,535,216 A | 7/1996 | Goldman et al. | |
| 5,566,174 A * | 10/1996 | Sato et al. | 370/468 |
| 6,721,957 B1 * | 4/2004 | Lawrence | 725/114 |
| 6,724,825 B1 * | 4/2004 | Nemiroff et al. | 375/240.27 |
| 7,349,386 B1 | 3/2008 | Gou | |
| 2005/0169181 A1 * | 8/2005 | Kim et al. | 370/235 |
| 2007/0189315 A1 * | 8/2007 | Aoyanagi | 370/412 |
| 2008/0152064 A1 * | 6/2008 | Kitagawa | 375/371 |
| 2009/0207908 A1 * | 8/2009 | Park et al. | 375/240.01 |

OTHER PUBLICATIONS

Digital Video Broadcasting (DVB); Measurement guidelines for DVB Systems; ETSI TR 101 290 V1.2.1 (May 2001) Technical Report; pp. 1-175.
Information Technology—Generic coding of moving pictures and associated audio information: Systems; International Standard; ISO/IEC 131818-1; Second Edition; Dec. 12, 2001; pp. 1-174.
(Draft Label) Beta Draft—Cisco Confidential; Chapter 4; Cisco VNware Network Element Applications; pp. 1-10.

* cited by examiner

*Primary Examiner*—Ricky Ngo
*Assistant Examiner*—Rasheed Gidado

(57) ABSTRACT

A system and method for processing of MPEG transport streams. Specifically, the system may receive a variable bit rate input transport stream with one or more programs. The variable bit rate transport stream is converted into a constant bit rate stream with compliant Program Clock References. Null packets are added to the transport stream at suitable locations to pad it to a constant bit rate. Program clock reference packets are re-stamped to ensure all timing requirements are met.

10 Claims, 10 Drawing Sheets

CONSTANT BIT RATE PADDING OF MPEG TRANSPORT STREAMS

FIELD OF THE INVENTION

The present invention generally relates to data communications. More particularly, the present invention relates to a system and method for converting a variable bit rate transport stream into a fixed bit rate transport stream with compliant program clock references.

BACKGROUND OF THE INVENTION

In digital video broadcasting (DVB), transport streams are used to deliver program data between a transmitter device and a receiver device. The transmission is typically communicated over networks. Program data has video and audio components, as well as ancillary information such as subtitles, teletext, and others.

The transmitter device receives as input the video, audio, and ancillary data components of one or more programs. The transmitter device compresses the data, divides the data into packets, and generates a single transport stream. A periodic Program Clock Reference (PCR) may be included in the generated transport stream. The PCR is used by the receiver device to present the audio and the video signals at the intended program rate. The transport stream is transmitted by the transmitter device to a network.

The receiver device obtains the transport stream from the network. The receiver device decodes the transport stream. The video, audio, and PCR components are parsed to reconstruct the transmitted program(s).

SUMMARY OF THE INVENTION

In one embodiment of the invention, a system for converting a variable bit rate transport stream to a constant bit rate transport stream is provided. The transport stream is generated by a transmitter device and is to be received by a receiver device. The system comprises the transmitter device, the receiver device, and a further device that has at least: (1) an input buffer to store a plurality of packets and at least two Program Clock References of an input transport stream; (2) a comparator coupled to the input buffer to determine if a complete Program Clock Reference (PCR) interval has been stored; (3) an arithmetic unit coupled to the comparator to compute a number of null packets to insert into an output transport stream if a complete PCR interval has been stored; and (4) a PCR restamper coupled to the arithmetic unit to restamp PCRs. The device may be implemented in the transmitter device, in the receiver device, or intermediary to the transmitter device and the receiver device.

For another embodiment of the invention, a method for converting a variable bit rate transport stream to a constant bit rate transport stream is provided. The method comprises: (1) receiving a variable bit rate transport stream with one or more programs, wherein the transport stream comprises at least one PCR flow; (2) storing a plurality of packets of the transport stream to a buffer; (3) computing a number of null packets to be inserted to the transport stream; and (4) distributing the null packets to the transport stream.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Transport bit rate is defined by the number of bits in the stream between two consecutive PCRs divided by the difference (expressed in time) between these two PCRs. The communication of compressed program data may include a variable bit rate (VBR) transport stream. The VBR transport stream can be seen as a piece-wise constant bit rate stream between every pair of successive PCRs. The program may be compressed in a number of formats, including MPEG-1, MPEG-2, MPEG-4, H.264, VC-1, and others. Some receiver devices are capable of accepting VBR transport streams, and processing or displaying them. Other devices, however, have strict timing requirements, and require transport streams at a fixed, or constant bit rate (CBR), for processing.

Figure 1A:
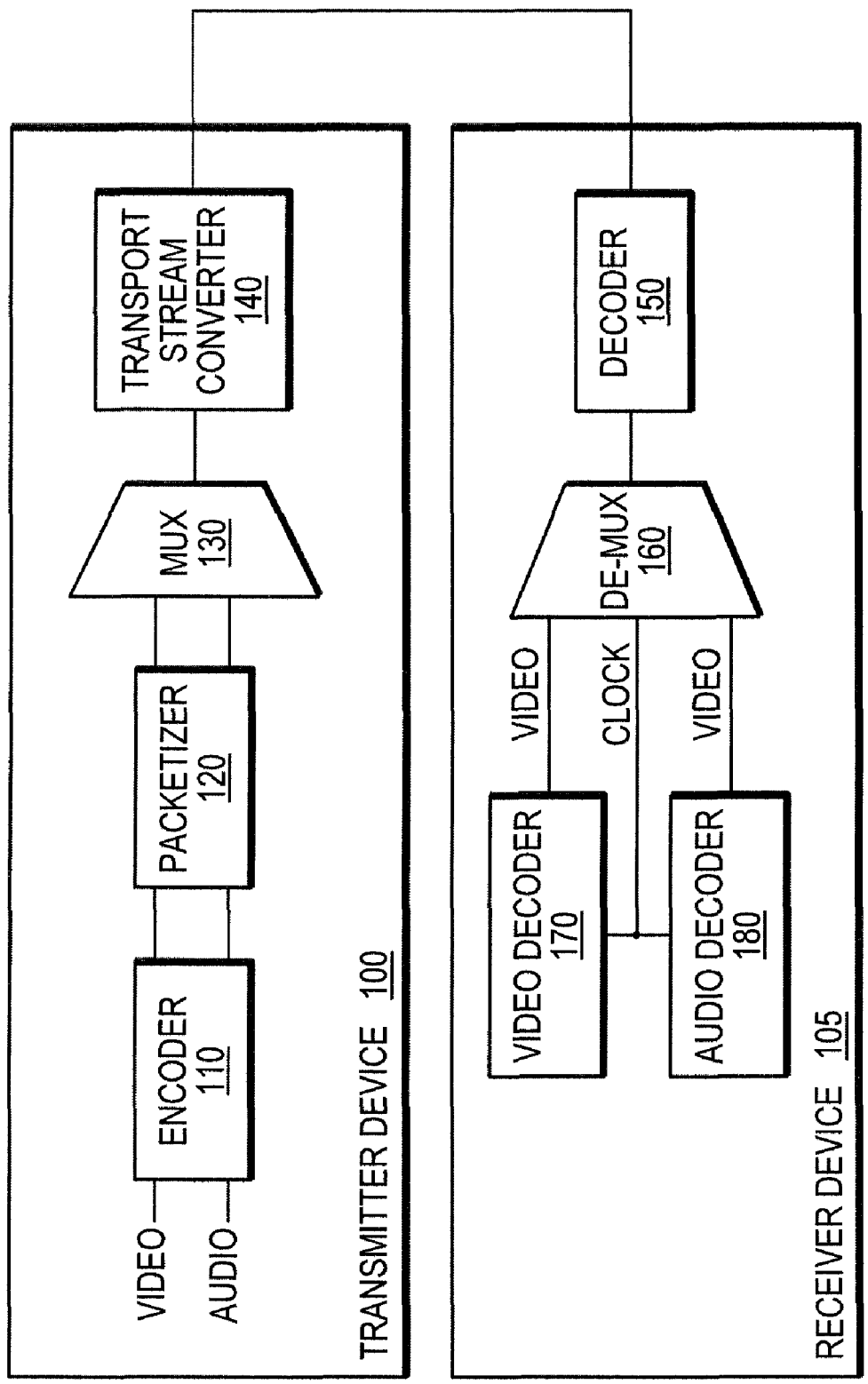
FIG. 1A is a block diagram of an embodiment for implementing a system having a VBR to CBR transport stream converter.

FIG. 1A depicts a block diagram of one embodiment of a system having a VBR to CBR transport stream converter. The system comprises a transmitter device 100 and a receiver device 105. Transmitter device 100 may be coupled to receiver device 105 via a network.

The transmitter device 100 may further comprise an encoder 110, a packetizer 120, a multiplexer (mux) 130, and a transport stream converter 140. Encoder 110 is coupled to packetizer 120. Packetizer 120 is coupled to multiplexer 130. Multiplexer 130 is coupled to transport stream converter 140.

The encoder 110 receives video and audio components of a program as inputs. The encoder 110 may compress and convert the inputs to digital form. A first generated elementary stream may comprise video data. A second generated elementary stream may comprise audio data. The elementary streams are inputs to packetizer 120.

The packetizer 120 produces packetized elementary streams. Each packetized elementary stream (PES) may comprise a header and a payload. The header may contain information necessary to decode the payload bits. The payload may comprise elementary encoded components such as audio and video signals.

The multiplexer 130 combines the packetized elementary streams of video and audio data to form a single transport stream. The multiplexer 130 is also responsible for further packetizing the packetized elementary streams into transport packets and inserting PCRs. One embodiment of an algorithm for inserting PCRs into transport packets is described in FIG. 6 below. For this embodiment of the invention, the transport stream is input to a transport stream converter 140 of the transmitter device 100. The transport stream converter 140 converts a VBR transport stream to a CBR transport stream. The implementation of the transport stream converter 140 is described in greater detail in FIG. 2 below.

The receiver device 105 comprises decoder 150, de-multiplexer (de-mux) 160, video decoder 170 and audio decoder 180. Decoder 150 is coupled to de-multiplexer 160. De-multiplexer 160 is coupled to video decoder 170 and audio decoder 180.

The decoder 150 may decode a transport stream based on a specific channel of the network. The de-multiplexer 160 separates the audio, the video, and the clock components of the transport stream. The clock may be used to synchronize the decoding of elementary streams to a common master PCR time base. Video decoder 170 decodes the video elementary stream. Audio decoder 180 decodes the audio elementary stream.

Figure 1B:
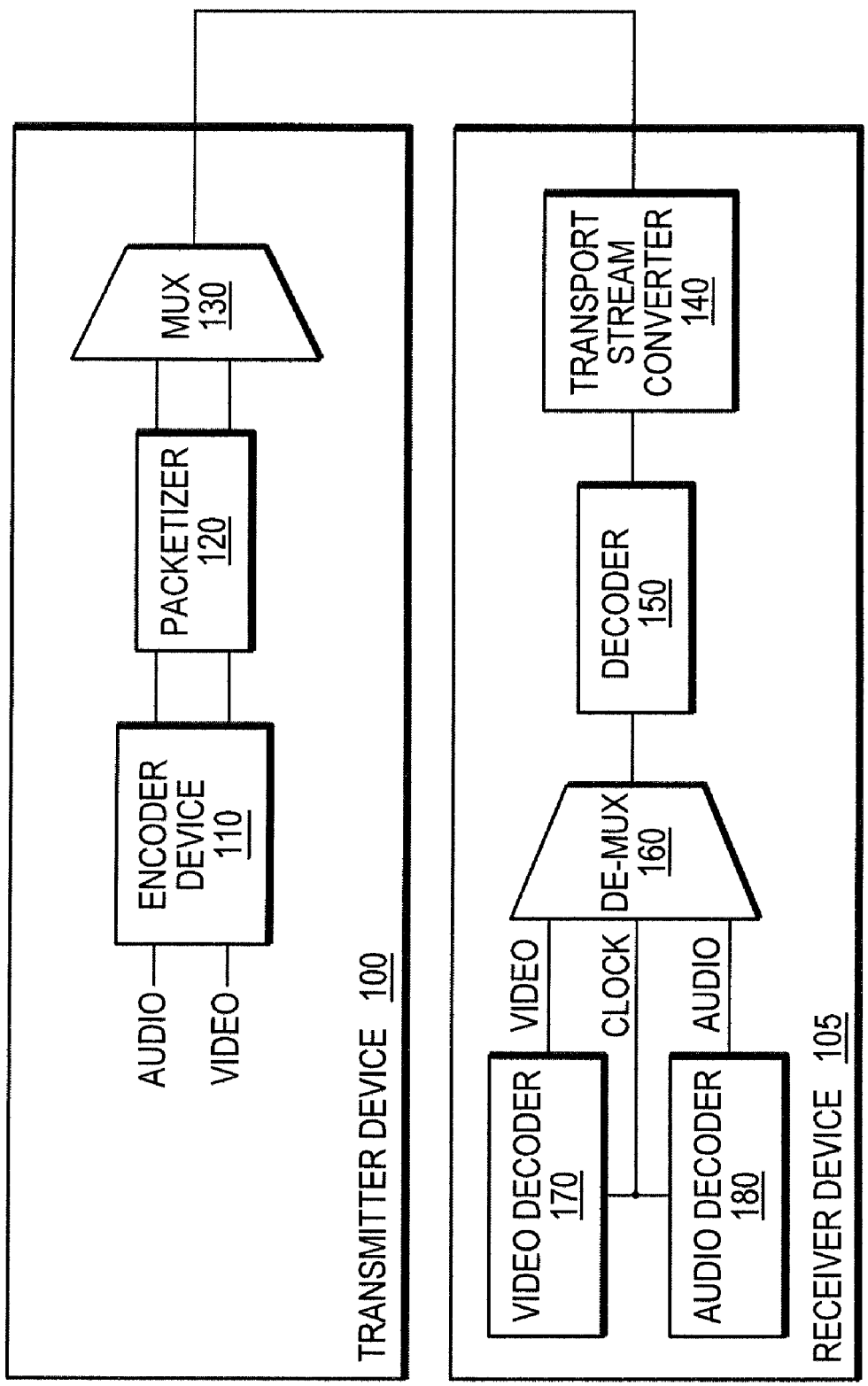
FIG. 1B is a block diagram of another embodiment for implementing a system having a VBR to CBR transport stream converter.

FIG. 1B depicts a block diagram of another embodiment for implementing a system having a VBR to CBR transport stream converter. Similar to FIG. 1A, the implementation of FIG. 1B comprises a transmitter device 100 and a receiver device 105. For this embodiment of the invention, however, the transport stream converter 140 is part of the receiver device 105. The functionality of transmitter device 100 components, encoder 110, packetizer 120, and multiplexer 130, are the same as previously described. In the receiver device 105, the transport stream converter 140 is coupled to decoder 150. The functionality of receiver device 105 components, transport stream converter 140, decoder 150, de-multiplexer 160, video decoder 170, and audio decoder 180, are the same as previously described.

Figure 1C:
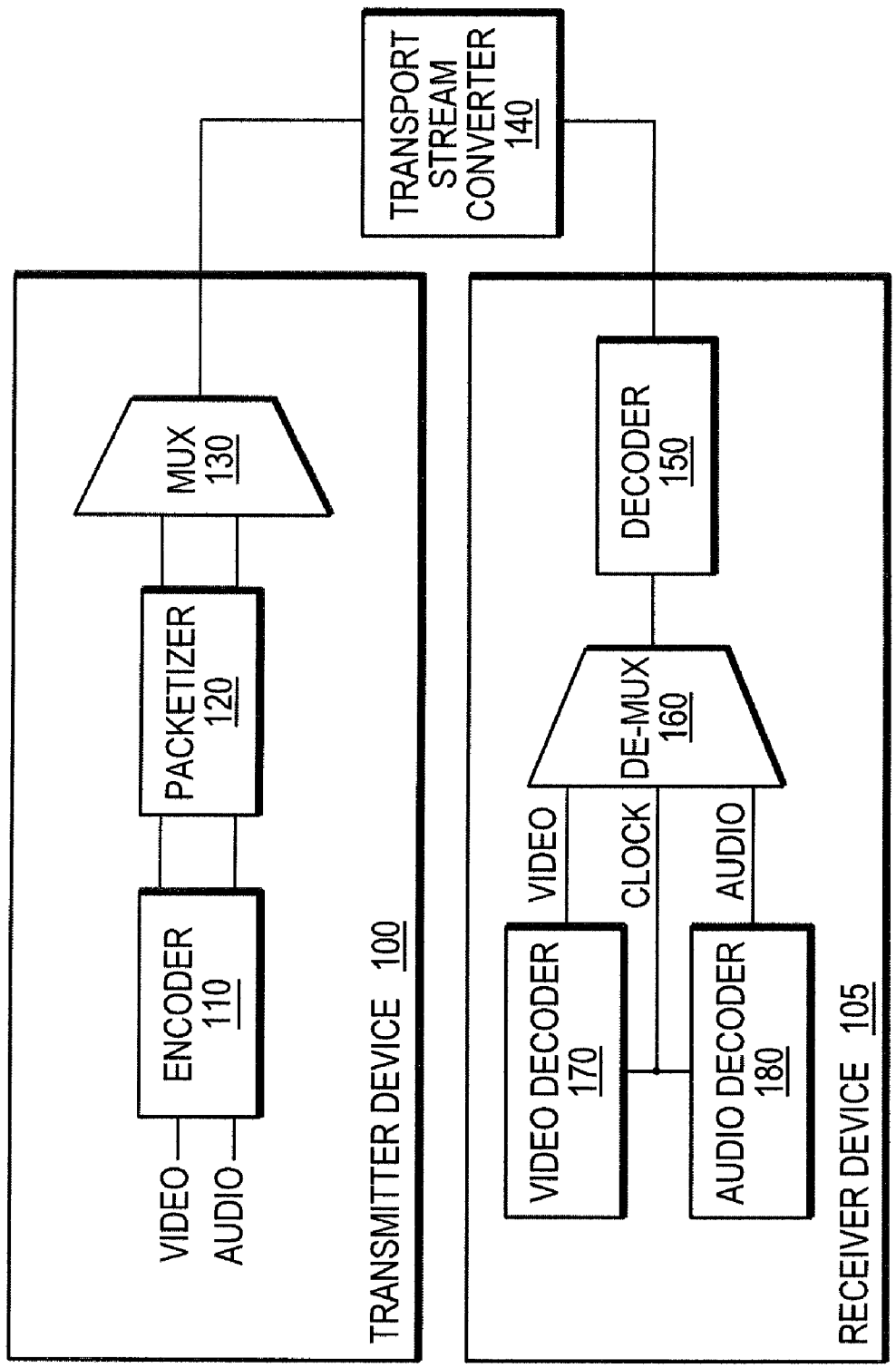
FIG. 1C is a block diagram of yet another embodiment for implementing a system having a VBR to CBR transport stream converter.

FIG. 1C depicts a block diagram of yet another embodiment for implementing a system having a VBR to CBR transport stream converter. Similar to FIG. 1A, the implementation of FIG. 1C comprises a transmitter device 100 and a receiver device 105. For this embodiment of the invention, however, the transport stream converter 140 is external to both the receiver device 105 and the transmitter device 100. The functionality of transmitter device 100 components, encoder 110, packetizer 120, and multiplexer 130, are the same as previously described. The functionality of receiver device 105 components, decoder 150, de-multiplexer 160, video decoder 170, and audio decoder 180, are the same as previously described.

Figure 2:
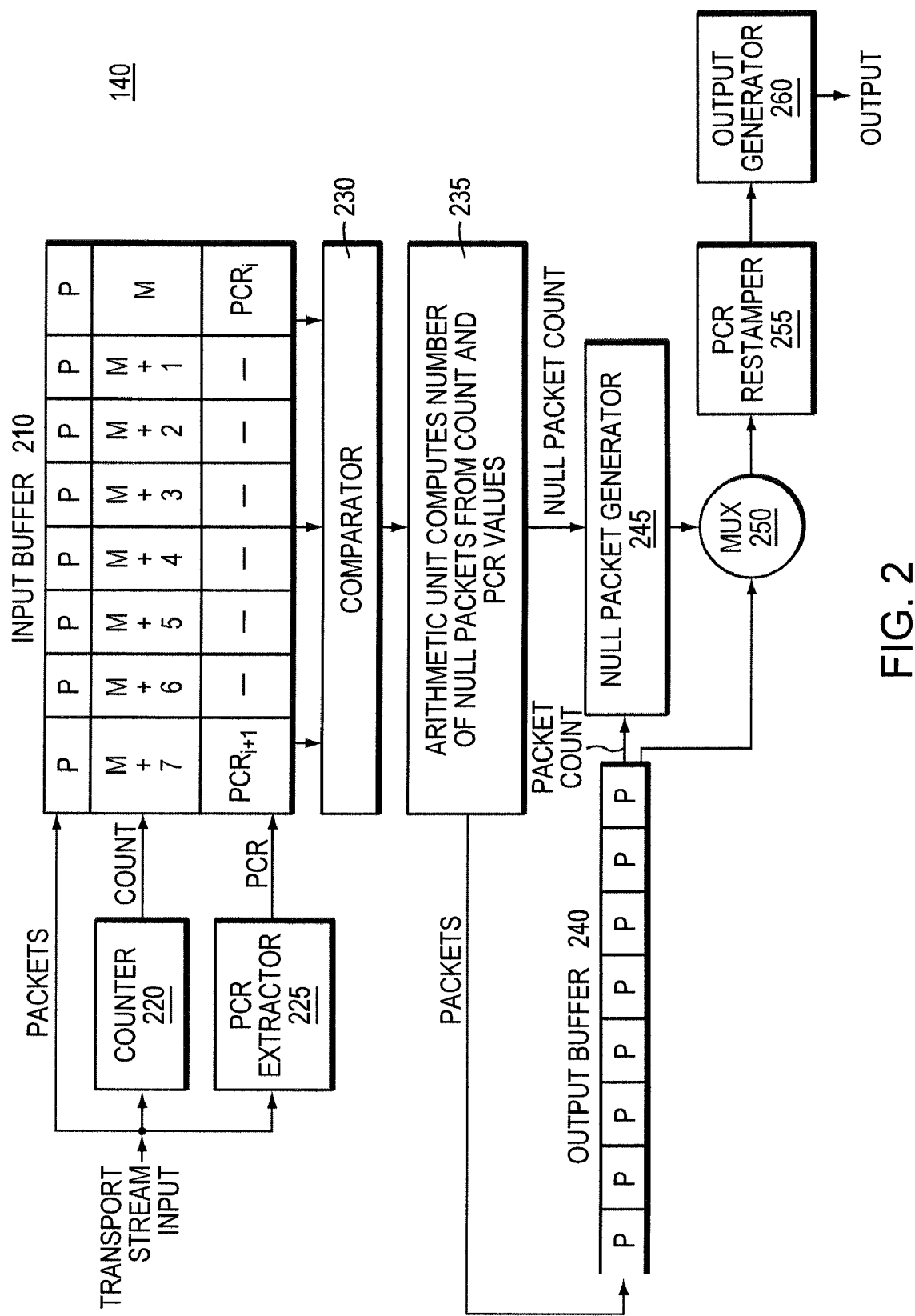
FIG. 2 is a block diagram of an embodiment of a transport stream converter.

FIG. 2 depicts a block diagram of a transport stream converter 140. Transport stream converter 140 comprises input buffer 210, counter 220, PCR extractor 225, comparator 230, arithmetic unit 235, output buffer 240, null packet generator 245, multiplexer 250, PCR restamper 255, and output generator 260. Input buffer 210 is coupled to counter 220, PCR extractor 225, and comparator 230. Comparator 230 is coupled to arithmetic unit 235. Arithmetic unit 235 is coupled to output buffer 240 and null packet generator 245. Null packet generator 245 is coupled to multiplexer 250. Multiplexer 250 is coupled to PCR restamper 255. PCR restamper 255 is coupled to output generator 260.

For this embodiment of the invention, a transport stream is received as input to the transport stream converter 140. Packets are received and stored to input buffer 210. A counter 220 may increment each time a packet is stored to input buffer 210. The counter value may be stored to the buffer 210 with its corresponding packet. The PCR extractor 225 may extract PCR values from the transport stream. The PCR values may be stored in the buffer 210 with its corresponding packet.

Comparator 230 identifies when the buffer 210 has stored a complete PCR interval. Once the comparator 230 determines that the buffer 210 has a complete PCR interval, the comparator 230 passes packets of the PCR interval to the arithmetic unit 235. The arithmetic unit 235 computes the number of null packets to be added to the transport stream. The null packets may pad the transport stream to a constant bit rate. Once the number of null packets is calculated, the packets are sent to output buffer 240. As the packets are output from the output buffer, null packets are inserted by null packet generator 245 and multiplexer 250 to the bitstream based on the packet count. PCR restamper 255 restamps PCR values to ensure that all timing requirements are met. The output generator 260 controls the output rate of the transport stream to the network. Embodiments of output generator 260 are described below in FIGS. 7 and 8.

Figure 3:
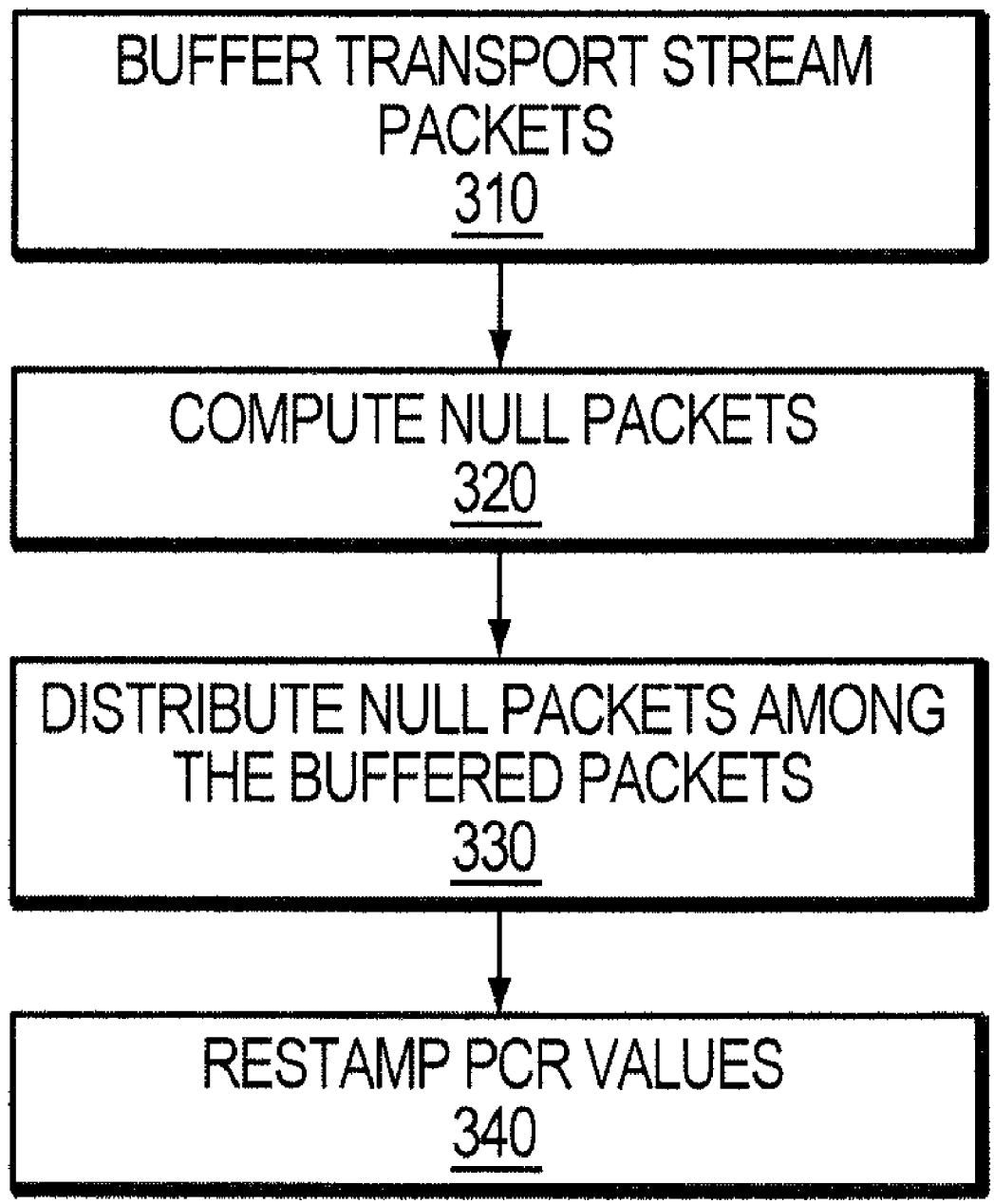
FIG. 3 is a flowchart of an embodiment for converting a VBR transport stream having a single PCR PID to a CBR transport stream.
Figure 4:
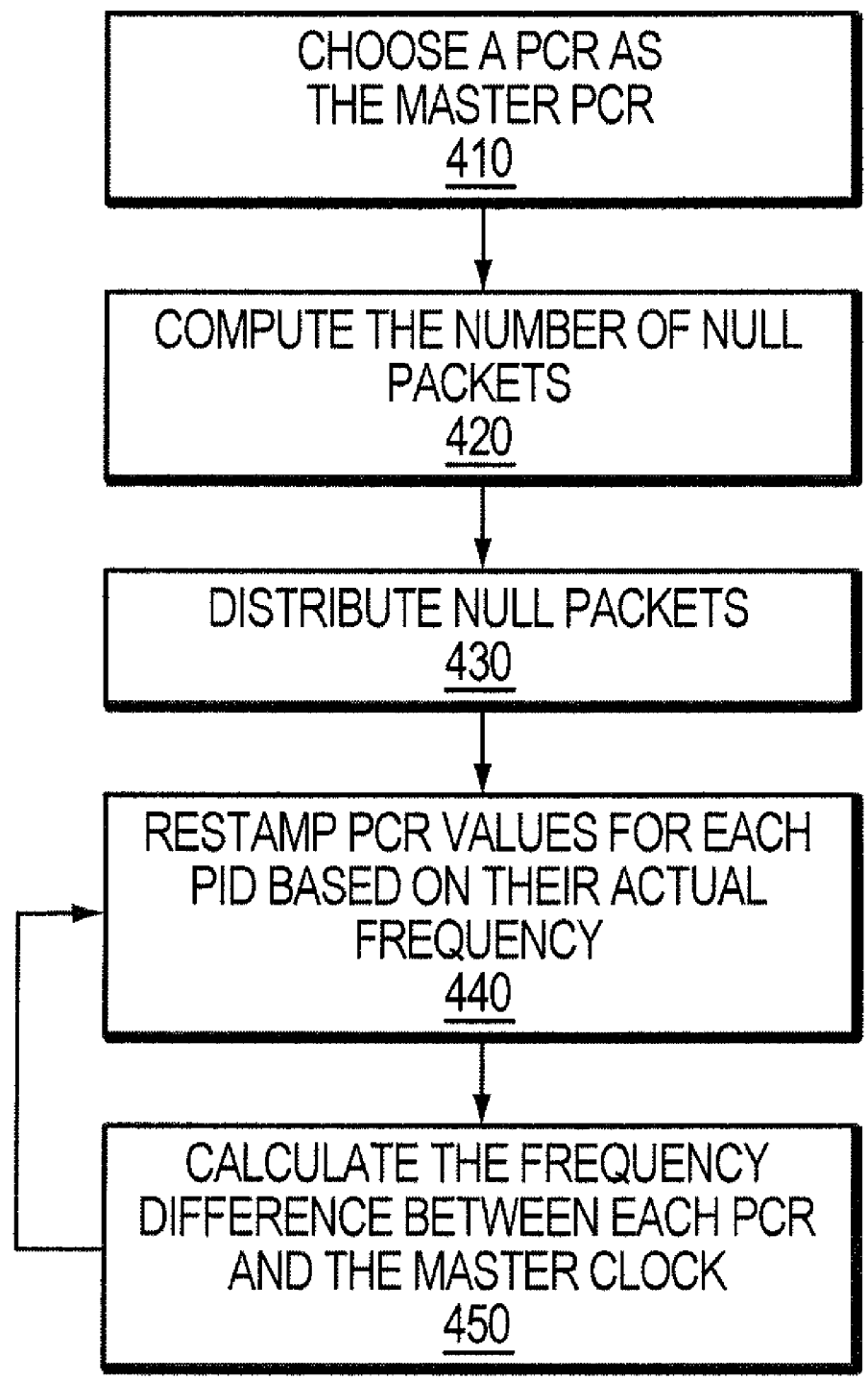
FIG. 4 is a flowchart of an embodiment for converting a VBR transport stream having multiple PCR PIDs to a CBR transport stream.

FIGS. 3 and 4 show algorithms for computing the number of null packets to be inserted, distributing the null packets among buffered transport stream packets, and restamping PCRs. More particularly, FIG. 3 depicts a flowchart of an embodiment for converting an input VBR transport stream having a single PCR packet identifier (PID) to a CBR transport stream. Each program to be transmitted may have a unique PID.

In operation 310, packets are received. Some packets may have a corresponding PCR. Upon reception of at least a first and a second PCR value, operation 320 computes the number of null packets to be inserted. The following equation calculates the number of bits required to pad the input rate to reach the target rate:

$$Diff = R_T(PI_{i+1} - PO_i) - BI. \quad \text{(equation 1)}$$

$R_T$ is the target bit rate of the transport stream converter 140. The target bit rate may be approximately equal to the bandwidth of the network. $PI_{i+1}$ is the $(i+1)^{th}$ input PCR value to the transport stream converter 140. The values of the input PCR values may be extracted from the input transport stream. $PO_i$ is the $i^{th}$ output PCR value from the transport stream converter 140. The first PCR value, $PO_1$, may be set to be equal to the first input PCR, $PI_1$. BI is the number of bits, or packets, in the input transport stream between the first PCR and the second PCR.

If Diff is greater than zero, then the following equation is used to calculate the number of null packets, NP:

$$NP = \left[\frac{Diff}{1504} + 0.5\right]. \quad \text{(equation 2)}$$

The Diff in equation 2 is divided by 1504 because the MPEG format defines a 188 byte, or 1504 bit, packet. Thus, for another embodiment of the invention, the divider value may be different if the packet to be transferred has a format that defines a different number of bits. The brackets in the formula denote the largest integer not greater than the calculated value. Otherwise, if Diff is less than or equal to zero, the number of null packets is zero.

In operation 330, null packets are uniformly distributed among the packets stored in the output buffer. In other words, the null packets may be uniformly distributed between the first and second input PCR values. If there are NP null packets to be inserted among T transport packets, the number of null packets $n_k$ to be inserted immediately after packet k, where k is from 1 to T, is given by:

$$n_k = \left[ \frac{k*NP}{T} - \sum_{i=1}^{k-1} n_i \right]. \quad \text{(equation 3)}$$

Adding null packets to the bitstream may alter the temporal position of subsequent output PCR values. Thus, in operation 340, output PCR values, $PO_{i+1}$, may be restamped in accordance with the equation:

$$PO_{i+1} = PO_i + \frac{BI + 1504 + NP}{R_T} * 27 * 10^6. \quad \text{(equation 4)}$$

The multiplier in equation 4 is $27*10^6$ because it is assumed that the PCRs are sampled from 27 MHz clocks. This multiplier may be different if the PCRs are sampled from a different clock frequency.

FIG. 4 depicts a flowchart for an embodiment for converting an input VBR transport stream having multiple PCR PIDs to a CBR transport stream. In operation 410, a PCR in the input transport stream is arbitrarily chosen as the master PCR. After at least a first PCR and a second PCR are received, in operation 420, the number of null packets to be added is computed by the formulas presented in equations 1 and 2. In this computation, only the chosen master PCR is considered for providing the time stamps, but all the transport bits are counted. If the value for Diff as calculated in equation 1 is less than zero, the number of null packets to be added is zero. In operation 430, the calculated number of null packets are evenly distributed among the buffered packets as set forth in equation 3.

In operation 440, the output PCRs are restamped based on their actual frequency. For each PCR-bearing PID, j, the first output PCR, $PO_1^j$, may be set to be equal to the first input PCR, $PI_1^j$. There may be a total of N PCR-bearing PIDs. If there are $T_i^j$ transport stream packets between PCRs $PO_i^j$ and $PO_{i+1}^j$, the output PCR should be restamped as follows:

$$PO_{i+1}^j = PO_i^j + \frac{1504*T_i^j}{R_T(1+\alpha_j)} * 27 * 10^6. \quad \text{(equation 5)}$$

The PCRs may be samples from 27 MHz clocks. Multiple PCRs in a transport stream, however, are not required to be from the same clock. Thus, the frequency difference between each PCR and the master PCR is calculated in operation 450. $(1+\alpha_j):1$ is the ratio between the 27 MHz clock for PCR-bearing PID j and the 27 MHz clock for the master PCR. The value of $(1+\alpha_j)$ of each PID may be estimated by comparing a sequence of input PCRs, $PI_i^j$, and output PCR errors, $PO_i^j - PI_i^j$.

The addition of null packets into the transport stream may inject jitter. If there is a frequency drift, the average output PCR error may increase linearly with time. For one embodiment of the invention, the average output PCR error may be estimated with a least-squares fitting of a linear equation to the data. For a given set of samples, $(X_1, Y_1), (X_2, Y_2), (X_3, Y_3), \ldots (X_N, Y_N)$, the best fit for an equation of type $y=a_0+a_1x$ is given by:

$$a_0 = \frac{\sum Y \sum X^2 - \sum X \sum XY}{N \sum X^2 - (\sum X)^2}. \quad \text{(equation 6)}$$

$$a_1 = \frac{N \sum XY - \sum X \sum Y}{N \sum X^2 - (\sum X)^2}. \quad \text{(equation 7)}$$

Applying a set of data samples to equations 6 and 7, the value of correction factor, $\alpha$, is approximately equal to $a_1$. The output PCR error at the beginning of the measurement period is approximately equal to $a_0$. The output PCR error at the end of the measurement period, $PO_N-PI_N$, is approximately equal to $a_0+a_1PI_N$.

A good estimate of $\alpha$ may be obtained if data samples are collected over a period of time and applied to equations 6 and 7. For the first estimation period, $\alpha$ may be set to zero. For any value of $\alpha$, there may be a steady-state error of $a_0+a_1PI_N$ at the end of the estimation period. During the next period, the steady-state error and the frequency ratio may be used to compensate for the output PCR error. The calculated frequency estimation in operation 450 is used to restamp PCR values for each PID in operation 440. Long-term drift may be decreased by periodically correcting the estimation.

Figure 5:
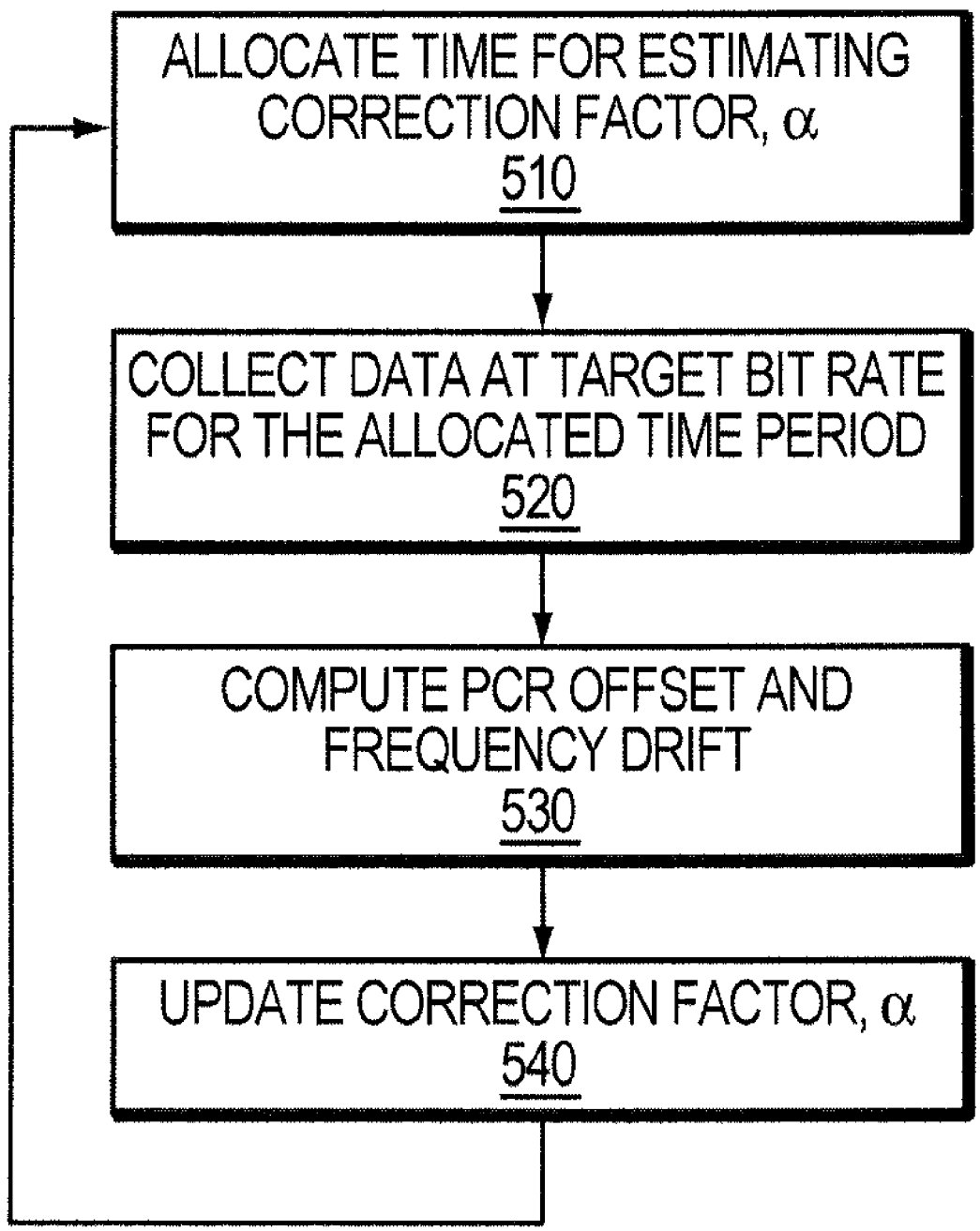
FIG. 5 is a flowchart of one embodiment for calculating an error correction variable, $\alpha$, to re-stamp the PCRs.

FIG. 5 depicts a flowchart of one embodiment for estimating $\alpha$. In operation 510, for every PID, a time duration is allocated for estimating a value for $\alpha$. For one embodiment of the invention, the time duration for estimation may be set for five minutes. In the worst case, when the transport clock is 30 parts per million (ppm) below 27 MHz, and the fastest clock is 30 ppm above 27 MHz, the drift will be 1620 Hz. Over five minutes, this will cause a PCR drift of 486,000 ticks, or 18 milliseconds.

In operation 520, data is collected using the target bit rate of PID j, $R_T^j$, for the period of time defined in operation 510. The data collected is then applied to equations 6 and 7 in operation 530 to obtain the PCR offset and frequency drift. For one embodiment of the invention, a phase lock loop may compare an input PCR, $PI_i^j$, and an output PCR, $PO_i^j$, to generate an output PCR error, $PO_i^j - PI_i^j$, and correction factor, $\alpha_j$, for each PID having a PCR. In operation 540, the updated correction factor $\alpha_j$ is supplied to the PCR restamping module, and is used in accordance with equation 5 to cancel out the PCR error. The algorithm then returns to operation 510 to periodically correct for PCR drift.

The algorithm presented in FIG. 5 presents a potential compliance problem anytime after a PCR is corrected. There is a possibility that a buffer model is violated. For example, the timing path between the encoder and the multiplexer in the transmitter device may lot leave any additional timing margins. It is not practical for a multiplexer to check the state of the buffers before making any correction. In addition, it is not possible for the multiplexer to check the state of the buffers if the bitstream is scrambled. Therefore, the analysis and retiming of PCR values may be performed in a transport stream converter as set forth below.

DVB compliance requires that PCR spacing be no more than 40 milliseconds. Equations 6 and 7 do not guarantee that this requirement will be met even if the input stream is compliant. For example, if two incoming PCRs are approximately 40 milliseconds apart, $PO_i$ may receive a negative correction and $PO_{i+1}$, may receive a positive correction. As a result, it is possible that the difference between $PO_i$ and $PO_{i+1}$ is greater than 40 milliseconds.

Figure 6:
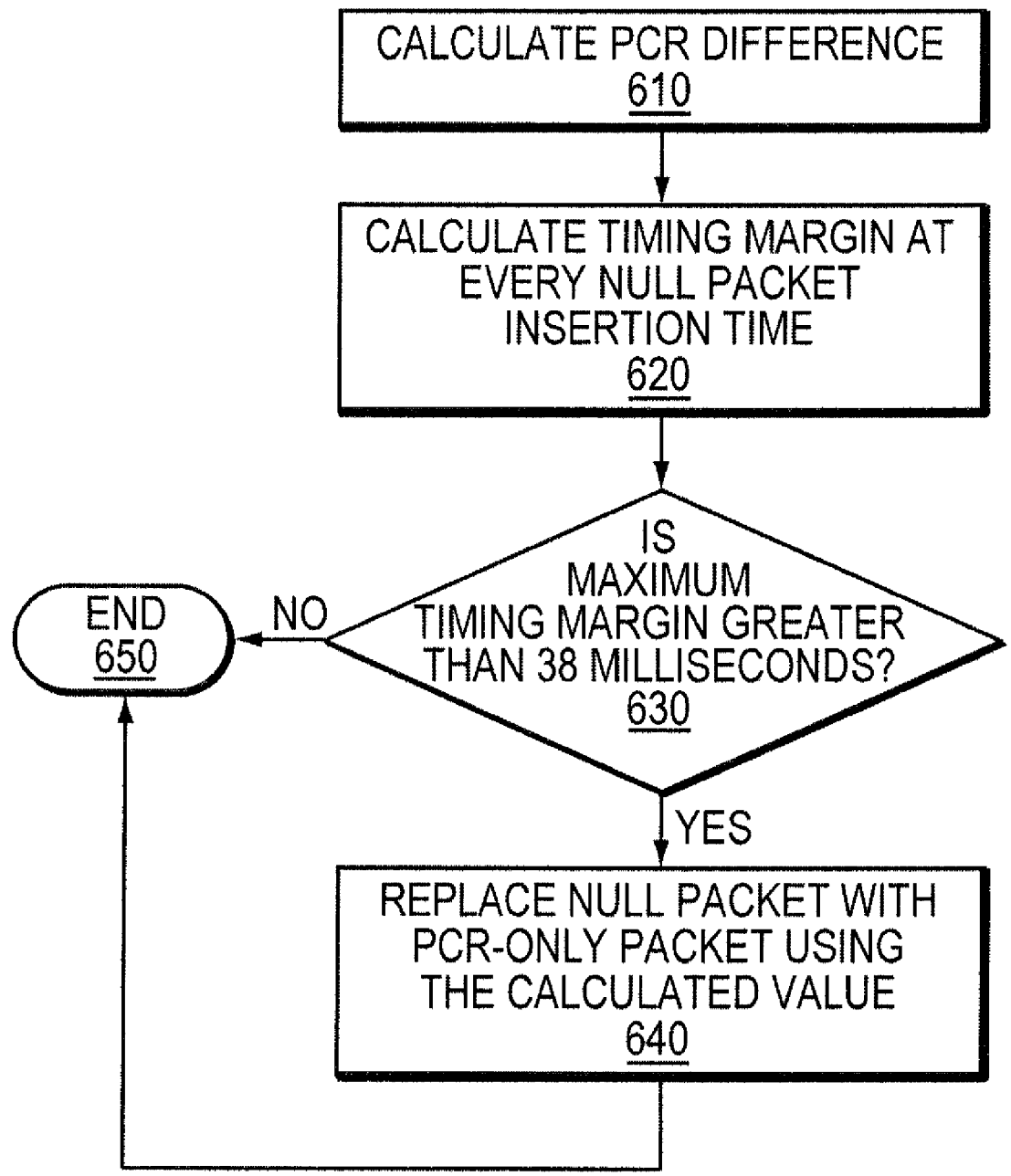
FIG. 6 is a flowchart for an embodiment for preventing PCR spacing compliance issues.

FIG. 6 depicts a flowchart for an embodiment for preventing PCR spacing compliance issues. For this embodiment, PCR packets may be inserted instead of null packets in some cases. The inserted PCR packets may have the same PID as the PCR flow that is at risk of non-compliance. The PCR packets may have no payload. Thus, the adaptation field of the PCR packets may be 183 bytes in length. The continuity counter of the PCR packets may be set to the same value as the previous packet in the flow. The PCR flag of the PCR packets may be set and the PCR field may be stamped.

After the output stream has already been padded with null packets, the interval difference between PCR packets for PID j is calculated in operation 610 in accordance with:

$$\frac{tp_i^j * 1504}{R_T(1+\alpha_j)} * 27 * 10^6. \quad \text{(equation 9)}$$

The variable $tp_i^j$ is the number of output transport packets after PCR packet i on PCR PID j at a given time. In operation 620, the maximum timing margin is calculated at every null packet insertion time in accordance with the following:

$$\max_j \left( \frac{tp_i^j * 1504}{Rt(1+\alpha_j)} * 27 * 10^6 \right). \quad \text{(equation 10)}$$

In operation 630, it is determined if the maximum timing margin as calculated in operation 620 is greater than approximately 38 milliseconds, or 1,026,000 ticks. If the maximum PCR difference is greater than 38 milleseconds, in operation 640 the null packet is replaced by a PCR stamped with the value:

$$PO_i^j + \frac{tp_i^j * 1504}{Rt(1+\alpha_j)} * 27 * 10^6. \quad \text{(equation 11)}$$

Following operation 640, or if the maximum timing margin is less than or equal to approximately 38 milliseconds in operation 630, the algorithm in FIG. 6 is terminated in operation 650.

Blocks of transport packets corresponding to roughly one PCR interval for the master PCR PID may be available to transmit at once. As a result, absent a controller, the output of the device may be a burst of back-to-back packets at approximately every 40 milliseconds. To avoid unnecessary saturation of network bandwidth, output generator 260 may be used to control the transport stream output rate.

Figure 7:
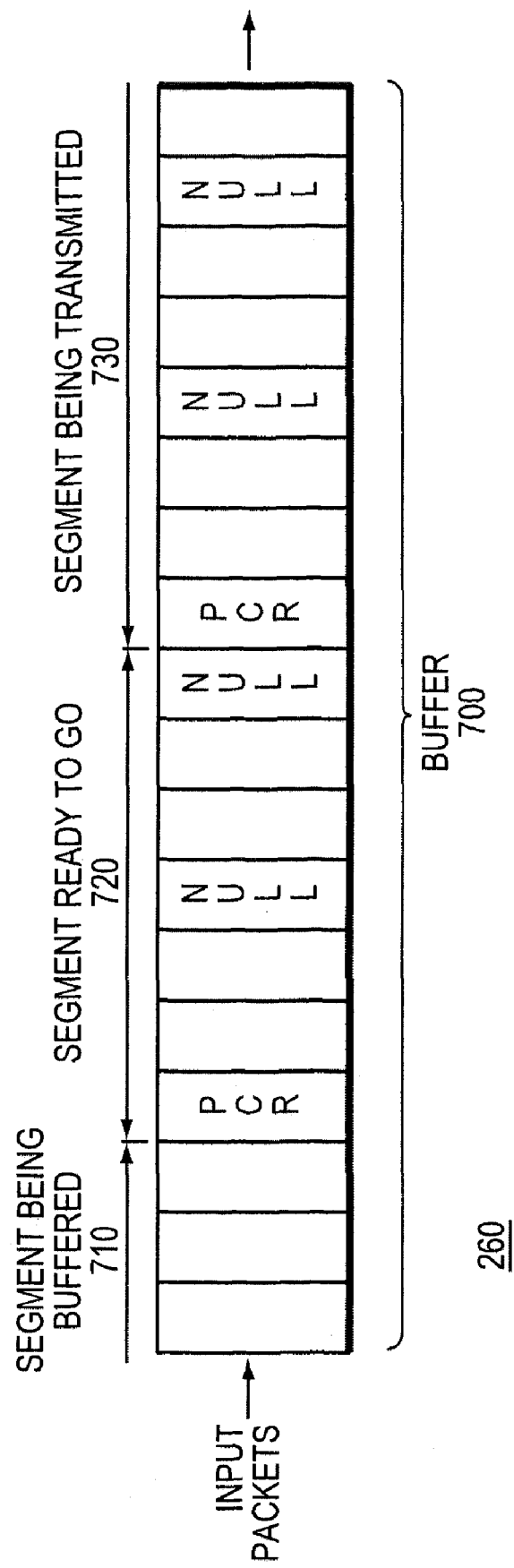
FIG. 7 is a block diagram of an embodiment of an output generator.

FIG. 7 depicts one embodiment for implementing output generator 260. For this embodiment, output generator is a first in, first out (FIFO) structure comprising a buffer 700 that may store data. The buffer 700 may further comprise a first segment 710 to store packets being buffered, a second segment 720 to store packets that are ready to be transmitted, and a third segment 730 storing packets that are being transmitted.

Packets input to the buffer 700 are initially part of the first segment 710. The padding algorithms set forth above may be executed on the packets, which may then be stored in the first segment 710. Once a PCR interval is received, the processed output stream becomes part of the second segment 720. Each transport packet added to the FIFO causes one transport packet to be dequeued from the buffer, if one is ready. The packet being dequeued becomes part of the third segment 730. The packet being dequeued may include any associated null values and/or extra PCRs.

Figure 8:
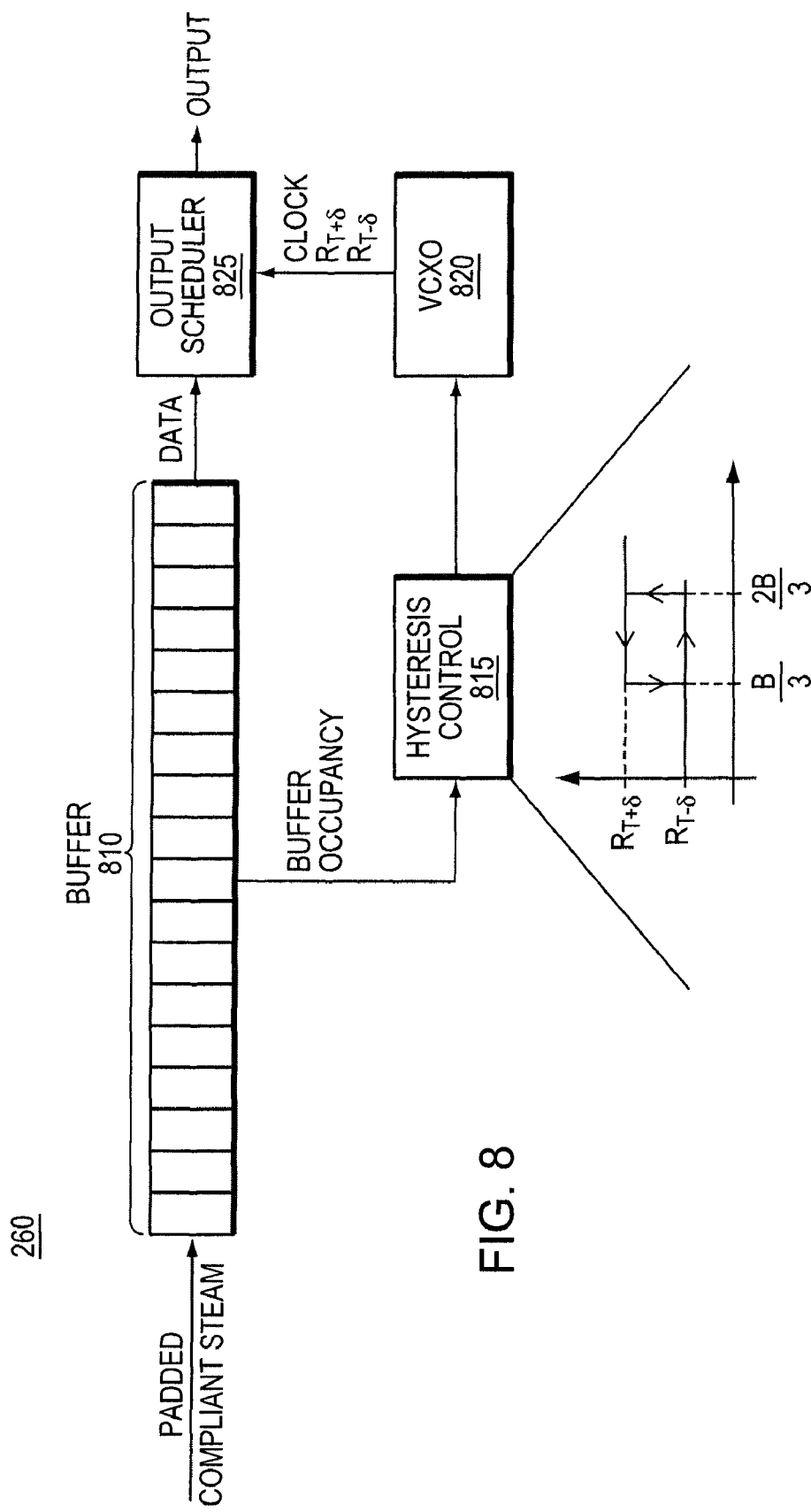
FIG. 8 is a block diagram of another embodiment of an output generator.

For another embodiment of the invention, an output generator 260 may be a buffer with hysteresis control as depicted in FIG. 8. The structure of FIG. 8 has two output rates. The first rate is slightly higher than nominal, and the second rate is slightly lower. If the buffer is headed for overflow, the rate that is slightly higher is used. On the other hand, if the buffer is headed for underflow, the slightly lower rate is used.

A hysteresis control may provide a transport stream that is completely CBR in time such that there is a constant inter-packet gap in time. In contrast, the output of the FIFO structure is dependent on the input of packets to the output generator 260.

The structure of FIG. 8 comprises buffer 810, hysteresis control 815, voltage controlled crystal oscillator (VCXO) 820, and output scheduler 825. Buffer 810 is coupled to output scheduler 825 and hysteresis control. Output scheduler 825 and hysteresis control 815 are further coupled to VCXO 820. The buffer 810 stores a transport stream that may be generated by padding algorithm(s) as set forth in FIGS. 3 and 4 above. The buffer 810 has a storage size B. The output scheduler 825 controls the output of the buffer.

Hysteresis control 815 tracks the remaining buffer capacity against the drain rate. If $R_T$ is the target output rate and Dr is the worst-case drift between the master PCR clock and the CPU clock, the buffer 810 may be pre-filled with a transport stream until it is half full, or contains B/2 packets. At that time, the buffer may begin to be drained at a constant rate of $R_T+\delta$, where $\delta$ is the worst-case drift between the master PCR clock and the CPU clock. Hysteresis control 815 outputs the tracked drain rate to VCXO 820. VCXO generates a clock that controls the data output rate from output scheduler. When the clock is between a first frequency range, a first output rate is produced at the output scheduler. When the clock is between a second frequency range, a second output clock is produced at the output scheduler. Any time the buffer occupancy falls below B/3, the drain rate of the output scheduler 825 may be switched to $R_T-\delta$. Any time the buffer occupancy exceeds 2B/3, the drain rate of the output scheduler 825 may be switched to $R_T+\delta$.

ISO IEC 13818-1, the international standard for "information technology—generic coding of moving pictures and associated audio information: systems," requires that the PCR clock be within ±30 ppm. Therefore, the value of $\delta$ may be 30 ppm plus the accuracy of the CPU clock. The value of B may be chosen as a function of the data rate. Since a block of packets does not become ready to transmit until the PCRs around it are received and processed, and since the target PCR interval for DVB compliance is 40 milliseconds, B may be chosen to be one second of bitstream. The number of transport packets in B may be expressed as $$\frac{1*R_T}{1504}.$$

In the forgoing specification, the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A device, comprising:
   an input buffer to store a plurality of packets and at least two Program Clock References of an input transport stream;
   a comparator coupled to the input buffer to determine if a complete Program Clock Reference (PCR) interval has been stored;
   an arithmetic unit coupled to the comparator to compute a number of null packets (NP) to insert to an output transport stream after a complete PCR interval has been stored;
   a PCR restamper coupled to the arithmetic unit to restamp the at least two PCRs;
   an output generator coupled to the PCR restamper to control the output of the output transport stream; and wherein
   the number of NP to be inserted between an $i^{th}$ input PCR and an $i+1^{th}$ input PCR is equal to $$\left[\frac{R_T(PI_{i+1} - PO_i) - BI}{1504} + 0.5\right]$$

if $R_T(PI_{i+1} - PO_i) - BI$ is greater than zero, wherein $R_T$ is the target bit rate of an output transport stream, wherein $PI_i$ is the $i^{th}$ input PCR value, wherein $PI_{i+1}$ is the $i+1^{th}$ input PCR value, $PO_i$ is an $i^{th}$ output PCR value, wherein BI is the number of bits between the $i^{th}$ input PCR and the $i+1^{th}$ input PCR, and wherein $PO_i$ is set equal to $PI_i$.

2. The device of claim 1, wherein the number of null packets $n_k$ to be inserted after a packet k, wherein k is an integer from 1 to T, is equal to $$\left[\frac{k*NP}{T} - \sum_{i=1}^{k-1} n_i\right].$$

3. The device of claim 1, further comprising:
   a PCR extractor coupled to the input buffer to extract the at least two PCRs from the transport stream, wherein the input buffer stores the extracted PCRs.

4. The device of claim 1, further comprising:
   a counter coupled to the input buffer to provide a respective count for each packet stored to the input buffer, wherein the input buffer stores the respective count.

5. The device of claim 1, wherein the restamper sets an $i+1^{th}$ output PCR value, $PO_{i+1}$, to be equal to $$PO_i + \frac{BI + 1504 + NP}{R_T} * 27 * 10^6$$

if the transport stream has a single PCR packet identifier.

6. The device of claim 1, wherein the restamper sets an $i+1^{th}$ output PCR value of $j^{th}$ packet identifier $PO_{i+1}^j$ to be equal to $$PO_i^j + \frac{1504 * T_i^j}{R_T(1+\alpha_j)} * 27 * 10^6$$

if j is an integer from two to N, wherein $PO_i^j$ is the $i^{th}$ output PCR value of a $j^{th}$ packet identifier, wherein $T_i^j$ is the number of transport stream packets between $PO_i^j$ and $PO_{i+1}^j$, wherein $PO_1^j$ is set to be equal to the first input PCR value of the $j^{th}$ packet identifier $PI_1^j$, wherein $(1+\alpha_j):1$ is the ratio between a clock for a PCR-bearing PID j and a clock for master PCR.

7. The device of claim 1, wherein the output generator comprises a first in, first out buffer.

8. The device of claim 1, wherein the output generator has a first output rate and a second output rate.

9. The device of claim 8, wherein the output generator comprises:
   a buffer;
   a hysteresis control coupled to the buffer to track occupancy of the buffer;
   an output scheduler coupled to the buffer to enable data to be output from the buffer;
   a voltage-controlled crystal oscillator coupled to the hysteresis control and the output scheduler to provide a clock to the output scheduler, wherein the clock is a function of the buffer occupancy, wherein the clock has a first frequency that corresponds with the first output rate and a second frequency that corresponds with the second output rate.

10. The device of claim 9, wherein the output generator is initially set to the first output rate, wherein the output generator is switched to the second output rate if the buffer falls below a predetermined occupancy.

* * * * *

UNITED STATES PATENT AND TRADEMARK OFFICE
CERTIFICATE OF CORRECTION

PATENT NO. : 7,899,089 B2
APPLICATION NO. : 12/169835
DATED : March 1, 2011
INVENTOR(S) : Noronha, Jr.

Page 1 of 2

It is certified that error appears in the above-identified patent and that said Letters Patent is hereby corrected as shown below:

On the Face Page, in Field (56), under "OTHER PUBLICATIONS", in Column 2, Line 6, delete "131818-1;" and insert -- 13818-1; --, therefor.

On the Face Page, in Field (56), under "OTHER PUBLICATIONS", in Column 2, Line 6, delete "Dec. 12, 2001;" and insert -- Dec. 1, 2000; --, therefor.

On the Face Page, in Field (56), under "OTHER PUBLICATIONS", in Column 2, Line 8, delete "VNware" and insert -- VMware --, therefor.

In Fig. 1A, Sheet 1 of 10, delete " " and insert -- --, therefor. 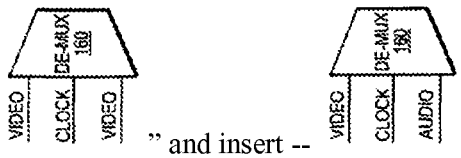

In Fig. 1B, Sheet 2 of 10, delete " " and insert -- --, therefor. 

In Fig. 8, Sheet 10 of 10, delete " " and insert -- --, therefor. 

In Column 4, Line 54, delete "$PO_1$," and insert -- $PO_i$, --, therefor.

Signed and Sealed this
Seventh Day of June, 2011

David J. Kappos
*Director of the United States Patent and Trademark Office*

CERTIFICATE OF CORRECTION (continued)

U.S. Pat. No. 7,899,089 B2

In Column 4, Line 55, delete "$PI_1$." and insert -- $PI_i$. --, therefor.

In Column 5, Line 8, delete "other," and insert -- other --, therefor.

In Column 5, Line 53, delete "$PI_1^j$." and insert -- $PI_i^j$. --, therefor.

In Column 7, Line 8, delete "$PO_{i+1}$," and insert -- $PO_{i+1}$ --, therefor.

In Column 7, Lines 36-38, in equation 10, delete "$\max_j \left( \frac{tp_i^j * 1504}{Rt(1+\alpha_j)} \right)$" and insert -- $\max_j \left( \frac{tp_i^j * 1504}{R_T(1+\alpha_j)} \right)$ --, therefor.

In Column 7, Lines 48-50, in equation 11, delete "$PO_i^j + \frac{tp_i^j * 1504}{Rt(1+\alpha_j)}$" and insert -- $PO_i^j + \frac{tp_i^j * 1504}{R_T(1+\alpha_j)}$ --, therefor.

In Column 10, Line 18, in Claim 6, delete "of" and insert -- of a --, therefor.

In Column 10, Line 29, in Claim 6, delete "$PO_1^j$" and insert -- $PO_i^j$ --, therefor.

In Column 10, Line 30, in Claim 6, delete "$PI_1^j$," and insert -- $PI_i^j$, --, therefor.